US012501245B2

(12) United States Patent
Fodrini et al.

(10) Patent No.: US 12,501,245 B2
(45) Date of Patent: Dec. 16, 2025

(54) METHOD FOR MANAGING A C-V2X CONNECTION IN AN INTER-PLMN SCENARIO, AND TELECOMMUNICATIONS SYSTEM OPERATING ACCORDING TO SAID METHOD

(71) Applicant: TELECOM ITALIA S.p.A., Milan (IT)

(72) Inventors: Maurizio Fodrini, Turin (IT); Damiano Rapone, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 363 days.

(21) Appl. No.: 18/258,917

(22) PCT Filed: Dec. 13, 2021

(86) PCT No.: PCT/IB2021/061610
§ 371 (c)(1),
(2) Date: Jun. 22, 2023

(87) PCT Pub. No.: WO2022/137004
PCT Pub. Date: Jun. 30, 2022

(65) Prior Publication Data
US 2024/0049080 A1     Feb. 8, 2024

(30) Foreign Application Priority Data

Dec. 23, 2020     (IT) .................. 102020000032132

(51) Int. Cl.
| | |
|---|---|
| *H04W 4/44* | (2018.01) |
| *H04W 36/00* | (2009.01) |
| *H04W 36/14* | (2009.01) |
| *H04W 36/30* | (2009.01) |
| *H04W 4/46* | (2018.01) |
| *H04W 4/48* | (2018.01) |
| *H04W 84/04* | (2009.01) |

(52) U.S. Cl.
CPC .......... *H04W 4/44* (2018.02); *H04W 36/037* (2023.05); *H04W 36/14* (2013.01); *H04W 36/305* (2018.08); *H04W 84/042* (2013.01)

(58) Field of Classification Search
CPC .......... H04W 4/44; H04W 4/46; H04W 4/48; H04W 36/14; H04W 84/042; H04W 36/037; H04W 36/305
See application file for complete search history.

(56) References Cited

U.S. PATENT DOCUMENTS

| | | | |
|---|---|---|---|
| 2018/0192268 A1* | 7/2018 | Xu ..................... | H04W 76/10 |
| 2020/0288341 A1* | 9/2020 | Karella ................ | H04W 4/44 |

FOREIGN PATENT DOCUMENTS

| EP | 3352484 A1 * | 7/2018 | ............ H04W 88/04 |
|---|---|---|---|

OTHER PUBLICATIONS

International Search Report Issued Mar. 10, 2022, in PCT/IB2021/061610, filed on Dec. 13, 2021, 11 pages.
(Continued)

*Primary Examiner* — Jinsong Hu
*Assistant Examiner* — Farideh Madani
(74) *Attorney, Agent, or Firm* — Oblon, McClelland, Maier & Neustadt, L.L.P.

(57) ABSTRACT

A method for managing a Cellular Vehicle-to-Everything, C-V2X, connection comprising: establishing a first C-V2X connection between a first Radio Base Station, RBS, of a source Public Land Mobile Network, PLMN, and an electronic On-Board Unit, OBU, of a vehicle; establishing a second C-V2X connection between said first RBS and a first Road Side Unit Gateway, RSUG,; establishing a point-to-point connection between said first RSUG and said OBU, wherein, over said point-to-point connection, User Plane data are exchanged, which are the same User Plane data exchanged over said second C-V2X connection; at a first
(Continued)

Application Server, AppServ, of said source PLMN, receiving from a second AppServ, of a target PLMN, a request signal, including a request for C-V2X context information, said C-V2X context information comprising a context of said OBU related to the C-V2X service provisioned over said second C-V2X connection; sending, from said first AppServ, to said second AppServ, said C-V2X context information.

19 Claims, 10 Drawing Sheets

(56) References Cited

OTHER PUBLICATIONS

5GAA WG4: "LS to extend the scope of eV2X", 3GPP Draft; R2-2006537.zip SP-191261, 3rd generation partnership project (3GPP), Mobile Competence Centre; 650, Route Des Lucioles ; F-06921 Sophia-Antipolis Cedex ; France No. Turin; Nov. 11, 2019-Nov. 14, 2019 Jul. 31, 2020 (Jul. 31, 2020), XP051910368, Retrieved from the Internet: URL:https://ftp.3gpp.org/tsg_ran/WG2_RL2/T SGR2_111-e/Docs/R2-2006537.zip, 2 pages.

Huawei et al: "Proposal for key issue on multi-PLMN coordination", 3GPP Draft; S6-191907_WAS1788 -FS_EV2XAPP-multi-PLMN coordination, 3rd generation partnership project (3GPP), Mobile Competence Centre ; 650, Route Des Lucioles; F-06921 Sophia-Antipolis Cedex ; FRA vol. SA WG6, No. Sophia Antipolis, France; Sep. 2, 2019-Sep. 6, 2019 Sep. 8, 2019 (Sep. 8, 2019), XP051784352, Retrieved from the Internet: URL:http://www.3gpp.org/ftp/tsg_sa/WG6_MissionCritical/TSGS6_033_Sophia_Antipolis/Do cs/S6-191907.zip [retrieved on 2019-09-08], 3 pages.

Italian Search Report issued Jun. 24, 2021, in Italian Application 102020000032132 filed on Dec. 23, 2020, 12 pages (with English Translation of Categories of Cited Documents).

* cited by examiner

METHOD FOR MANAGING A C-V2X CONNECTION IN AN INTER-PLMN SCENARIO, AND TELECOMMUNICATIONS SYSTEM OPERATING ACCORDING TO SAID METHOD

BACKGROUND OF THE INVENTION

Field of the Invention

The present invention refers to a method for managing a C-V2X connection in an inter-PLMN scenario.

The present invention also refers to a telecommunications system operating according to said method.

In particular, the invention deals with C-V2X UE service continuity and data forwarding in an inter-PLMN scenario.

Description of the Related Art

As known, Cellular Vehicle-to-Everything (C-V2X) represents the way to realize the concept of the Cooperative, Connected and Automated Mobility (CCAM), for which several use cases have been identified [see, for example, 5GAA whitepaper "C-V2X Use Cases: Methodology, Examples and Service Level Requirements" available at https://5gaa.org/wp-content/uploads/2019/07/5GAA_191906_WP_CV2X_UCs_v1-3-1.pdf—last access Dec. 22, 2020]. Some of these use cases, for example, are characterized by extremely stringent requirements in terms of latency, reliability, UL/DL data rate, etc. which have to be met also in case of inter Mobile Network Operator (inter-MNO) scenarios, in particular when a C-V2X capable vehicle crosses the geographic border between two adjacent countries and changes serving network as a consequence of this crossing (cross-border scenario).

Currently available 3GPP standards for both the Evolved Packet System (EPS) and the 5G System (5GS) provide means (e.g. idle mode mobility, handover) to address such scenarios aiming at minimizing the loss of User Plane connectivity, communication and service provisioning towards C-V2X capable vehicles when operating in inter-MNO contexts. See, for example, 3GPP technical specifications TS 23.401, section 5.5 "Handover" and TS 23.502, section 4.9 "Handover procedures" for EPS and 5GS, respectively. These technical solutions, however, are not practically implemented due to excessive complexity along with the need for the involved operators to share sensitive data such as, for example, radio coverage related information as well as the Radio Access Technology (RAT) frequency layers deployed in a certain geographic area of interest where the cross-border scenario is likely to happen.

This topic is also in the scope of EU-funded 5G-PPP Phase 3 projects, such as, for example, 5G-CARMEN (https://5gcarmen.eu/—last access Dec. 22, 2020), where the identification of technical solutions to ensure seamless provision of User Plane connectivity and uninterrupted delivery of V2X services along European cross-border corridors in a multi-operator, multi-telco-vendor and multi-vehicle-OEM scenario is currently under discussion.

When C-V2X devices, i.e. vehicles, travel across mobile networks as in case of national roaming or cross-border the serving network (in the following termed as Public Land Mobile Network (PLMN), operated by an MNO) will change, potentially resulting in delays or disrupted service. This because vehicle-network connectivity may be lost—sometimes for minutes—up to a connection with a new network is established. In fact, the vehicle is requested to scan the spectrum to find a network it can (try) to use after which it needs to register at this new network.

Three cross-borders scenarios have been identified and analyzed (see, for example, "Keeping vehicles connected when they cross borders" available at https://www.ericsson.com/en/blog/2019/5/connected-vehicle-cross-border-service-coverage—last access Dec. 22, 2020) for evaluating the performance in terms of connection interruption time:

Scenario 1: baseline roaming—only the database in the subscriber's Home PLMN (HPLMN)—the Home Subscriber Server (HSS) for the EPS or the Unified Data Management/Repository (UDM/UDR) for the 5GS, is consulted to obtain user subscription data when the vehicle attempts to connect to a Visited PLMN (VPLMN). This typically results in several minutes (2-3 mins) of interruption and session breakdown since the new IP address has to be allocated to the UE.

Scenario 2: Idle mode mobility—it requires the configuration of an additional roaming interface between MNOs—S10 interface between the Mobility Management Entities (MMEs) for the EPS or N14 interface between the Access and Mobility management Function (AMFs) for the 5GS—in order to trace back to the previous connection and resume the User Plane connectivity. Additionally, both the HPLMN and the VPLMN have to be declared as Equivalent PLMNs, meaning that the vehicle is allowed to use both networks. Furthermore, a Radio Access Network (RAN) feature called Release with redirection needs to be configured so to assist the vehicle in finding the frequencies to use in the VPLMN. This scenario results in a loss of User Plane connectivity for around 1 second as the IP address is kept in the VPLMN. Moreover, such a scenario would require setting all the operators' networks at a certain geographic border as "Equivalent", hence resulting in a significant increase of management complexity.

Scenario 3: complete handover—it is based on the inter-PLMN handover feature (also known as S1 Handover in 3GPP EPS specifications and N2 Handover in 3GPP 5GS specifications) where both networks are configured to support complete handover of the User Plane connection which involves more configuration and coordination efforts between the involved MNOs since additional information about neighboring RAN nodes and radio cells is required. This scenario results in a loss of User Plane connectivity for around 0.1 seconds and it requires the aforementioned need for the involved operators to share sensitive data.

Document WO 2019/104280 discloses a multi-operator C-V2X communication system based on Multi-Access Edge Computing (MEC) to provide V2X service continuity within a C-V2X communication architecture that includes different network providers in the same country and/or different countries without service disruption and by ensuring end-to-end (E2E) performances. In particular, techniques are disclosed for vehicles from different operators to communicate directly with each other (e.g. by using PC5 interface), either in coverage or out-of-coverage areas. Such a direct communication is achieved by means of MEC applications and related MEC API in order for the vehicles to be authorized and properly configured to set up and manage the communication.

Document WO 2017/052683 discloses a system and methods for a registration and authorization procedure for enabling UEs or LTE RAN nodes (eNBs) to operate as an RSU and to host V2X safety IP services. It also includes a method for a V2X service advertisement as well as mobility management protocols for providing seamless connectivity to V2X services, by enabling V2X UEs to discover and maintain connectivity to V2X services with low overhead and latency. Moreover, a list of RSUs and corresponding services can be provided by a V2X function and, in order for a V2X UE to identify RSUs supporting V2X IP services, relevant UEs or eNBs may broadcast V2X service capabilities. Also addressed is the case of V2X service continuity during handover procedure between service host devices by exploiting the Proximity Services (ProSe) function with related discovery and direct communication (e.g. PC5 interface).

SUMMARY OF THE INVENTION

The Applicant observes that the techniques made available by the state of the art do not provide satisfactory solutions to the problem of service and connection continuity in the transition between two different PLMNs: known techniques—such as those disclosed above—do not provide actual continuity (seamlessness) for the vehicle connection, since a significant time is necessary for the transition from the HPLMN to the VPLMN, and/or require invasive modifications to the network entities.

In particular, the above solutions do not allow to:
1. avoid roaming interfaces (S10 for the EPS, N14 for the 5GS) to be deployed among a potentially high number of PLMNs, hence saving CAPital and OPerational EXpenditures (CAPEX and OPEX) for the involved operators;
2. avoid declaring all the involved PLMNs as "Equivalent" (this could be possible only if few networks are considered, but it is foreseen that a vehicle could travel across several countries before reaching its final destination);
3. avoid the configuration of additional RAN features (e.g., but not limited to, Release with Redirection) only for the purpose of cross-border mobility;
4. avoid extensions to already existing roaming agreements due to sensitive information to be shared among involved operators, e.g., but not limited to, RAT frequency layers currently available in the cross-border area, also implying that every change to the radio configuration made by a MNO on its own network has to be communicated to all the other operators affected by such change in network configuration.

In view of the above, the Applicant has identified the need to provide a method and a system capable of ensuring substantial seamless connection and service continuity in an inter-PLMN environment, avoiding at the same time a significant impact on the network structure and operation.

In the Applicant's view, this technique should exploit technologies being complementary to network-based ones, in particular point-to-point technologies such as LiFi, WiFi, Bluetooth, ITS-G5, PC5, etc., for extending the communication link with the HPLMN and realizing the vehicle's C-V2X context information transfer at V2X Application Server level. Such vehicle's C-V2X context information will be needed at the VPLMN side once the communication link with the vehicle will be established, over which the C-V2X service can be provided in the same way as prior to cross the border.

In the present description and the following claims, the expression "point-to-point technology" is meant to indicate a wireless technology that is a non-3GPP technology (e.g. LiFi, WiFi, Bluetooth, ITS-G5, etc.) or a non-network-based 3GPP technology (e.g. PC5). Thus, the expression "point-to-point technologies" comprises one or more non-3GPP technologies (e.g. LiFi, WiFi, Bluetooth, ITS-G5, etc.) and/or one or more non-network-based 3GPP technologies (e.g. PC5).

In the present description and in the following claims, the expression "sidelink connection" is meant to indicate a connection based at least partly on one or more point-to-point technologies. In an embodiment, a sidelink connection is based on one or more point-to-point technologies only. In another embodiment, a sidelink connection comprises both one or more point-to-point technologies and one or more cabled connections.

In the present description and in the following claims, the expression "direct link" is meant to indicate a sidelink connection between two entities, entirely based on one or more point-to-point technologies, without the interposition of further entities; in particular, the expression "direct link" will refer to the sidelink connection, based on one or more point-to-point technologies only, between a vehicle's On-Board Unit and a Road Side Unit Gateway, without the interposition of any Road Side Unit.

An aspect of the present invention relates to a method for managing a Cellular Vehicle-to-Everything, C-V2X, connection.

According to an embodiment of the present invention, the method comprises establishing a first C-V2X connection between a first Radio Base Station, RBS, of a source Public Land Mobile Network, PLMN, and an electronic On-Board Unit, OBU, of a vehicle.

According to an embodiment of the present invention, a C-V2X service is provisioned to said OBU over said first C-V2X connection.

According to an embodiment of the present invention, the method comprises establishing a second C-V2X connection between said first RBS and a first Road Side Unit Gateway, RSUG.

According to an embodiment of the present invention, the C-V2X service provisioned over said first C-V2X connection is also provisioned over said second C-V2X connection.

According to an embodiment of the present invention, the method comprises establishing a sidelink connection between said first RSUG and said OBU, wherein, over said sidelink connection, User Plane data are exchanged, which are the same User Plane data exchanged over said second C-V2X connection.

According to an embodiment of the present invention, the method comprises receiving, at a first Application Server, AppServ, of said source PLMN, from a second AppServ of a target PLMN, a request signal, including a request for C-V2X context information comprising a context of said OBU related to the C-V2X service provisioned over said second C-V2X connection.

According to an embodiment of the present invention, the method comprises sending, from said first AppServ to said second AppServ, said C-V2X context information.

According to an embodiment of the present invention, after establishing said sidelink connection, dropping of said first C-V2X connection occurs.

According to an embodiment of the present invention, the method comprises receiving, at said first RSUG, from said OBU, through said sidelink connection, a release indication for release of said second C-V2X connection.

According to an embodiment of the present invention, the method comprises receiving, at said first RBS, from said first RSUG, a radio link failure indication, triggered by said release indication, to release said second C-V2X connection.

According to an embodiment of the present invention, the method comprises sending, from said first RBS to said OBU, a configuration signal for configuring said OBU to perform power and/or quality measurements of neighbor Road Side Unit Gateways, RSUGs.

According to an embodiment of the present invention, the method comprises receiving, at said first RBS, from said OBU, an indication signal, representative of said power and/or quality measurements.

According to an embodiment of the present invention, the method comprises selecting, at said first RBS, said first RSUG among said neighbor RSUGs based on said indication signal.

According to an embodiment of the present invention, the method comprises transcoding User Plane data sent from said first RBS to said first RSUG according to a network-based technology through said second C-V2X connection into User Plane data according to a point-to-point technology to be sent to said OBU through said sidelink connection.

According to an embodiment of the present invention, said first RSUG supports multiple point-to-point technologies.

According to an embodiment of the present invention, the method comprises selecting, at said first RSUG, among said multiple point-to-point technologies, a determined point-to-point technology for said sidelink connection between said first RSUG and said OBU.

According to an embodiment of the present invention, said selecting is performed based on one or more of the following:
  power/quality estimates related to point-to-point technologies supported by the OBU of said vehicle; C-V2X service typologies currently provisioned to said vehicle and surrounding vehicles over respective C-V2X connections;
  actual level of usage of each of the point-to-point technologies implemented within the first RSUG;
  surrounding vehicles' C-V2X service requirements;
  availability of specific point-to-point technology(-ies) onboard of said surrounding vehicles.

According to an embodiment of the present invention, the method comprises, while said second C-V2X connection and said sidelink connection are active, establishing a third C-V2X connection between the OBU of said vehicle and said target PLMN.

According to an embodiment of the present invention, said release indication is sent from the OBU of said vehicle to the first RSUG after said third C-V2X connection is established.

According to an embodiment of the present invention, said sidelink connection comprises a direct link between the OBU and the first RSUG.

According to an embodiment of the present invention, the method comprises establishing, as part of the sidelink connection, a first communication link between the first RSUG and a first Road Side Unit, RSU, associated with said first RSUG, wherein User Plane data exchanged over said first communication link are the same User Plane data exchanged over said second C-V2X connection.

According to an embodiment of the present invention, the method comprises establishing, as part of the sidelink connection, a second communication link between the OBU of said vehicle and said first RSU, said second communication link being based on a point-to-point technology, wherein User Plane data exchanged over said second communication link are the same User Plane data exchanged over said first communication link.

According to an embodiment, dropping of the direct link occurs.

According to an embodiment of the present invention, when dropping of the direct link occurs, exchange of User Plane data between the first RBS and the OBU of said vehicle is obtained based on said first and second communication links and said second C-V2X connection.

According to an embodiment of the present invention, the method comprises establishing, as part of said sidelink connection, a third communication link between the first RSU and a second RSU, wherein User Plane data exchanged over said third communication link are the same User Plane data exchanged over said second C-V2X connection.

According to an embodiment of the present invention, the method comprises establishing, as part of said sidelink connection, a fourth communication link between the OBU of said vehicle and said second RSU, said fourth communication link being based on a point-to-point technology, wherein User Plane data exchanged over said fourth communication link are the same User Plane data exchanged over said first communication link.

According to an embodiment of the present invention, when the second communication link is released, exchange of User Plane data between the first RBS and the OBU of said vehicle is obtained based on said first, third and fourth communication links and the second C-V2X connection.

An aspect of the present invention relates to a telecommunications system for managing a Cellular Vehicle-to-Everything, C-V2X, connection.

According to an embodiment of the present invention, the telecommunications system comprises a first Radio Base Station, RBS, of a source Public Land Mobile Network, PLMN, for establishing a first C-V2X connection with an electronic On-Board Unit, OBU, of a vehicle.

According to an embodiment of the present invention, the telecommunications system comprises at least a first Road Side Unit Gateway, RSUG.

According to an embodiment of the present invention, the said first RBS is configured to send, to said OBU, a configuration signal for configuring said OBU to perform power and/or quality measurements of neighbor Road Side Unit Gateways, RSUGs.

According to an embodiment of the present invention, said first RBS is configured to receive, from said OBU, an indication signal, representative of said power and/or quality measurements.

According to an embodiment of the present invention, said first RBS is configured to select said first RSUG among said neighbor RSUGs based on said indication signal.

According to an embodiment of the present invention, said first RBS is configured for establishing a second C-V2X connection with said first RSUG.

According to an embodiment of the present invention, said first RSUG is configured for establishing a sidelink connection with said OBU, wherein, over said sidelink connection, User Plane data are exchanged, which are the same User Plane data exchanged over said second C-V2X connection.

According to an embodiment of the present invention, said telecommunications system further comprises a first Application Server, AppServ, of said source PLMN.

According to an embodiment of the present invention, said first AppServ is configured for receiving, from a second AppServ of a target PLMN, a request signal, including a request for C-V2X context information comprising a context of said OBU related to the C-V2X service provisioned over said second C-V2X connection.

According to an embodiment of the present invention, said first AppServ is configured for sending, to said second AppServ, said C-V2X context information.

According to an embodiment of the present invention, said first AppServ is configured for receiving said request signal after dropping of said first C-V2X connection has occurred.

According to an embodiment of the present invention, said first RSUG is configured for receiving from said OBU, through said sidelink connection, a release indication for release of said second C-V2X connection.

According to an embodiment of the present invention, said first RSUG is configured for sending, to said first RBS, a radio link failure indication, triggered by said release indication, to release said second C-V2X connection.

According to an embodiment of the present invention, said first RSUG comprises an Adaptation Unit, AU, module configured to receive User Plane data according to a network-based technology and transcode said User Plane data into User Plane data according to a point-to-point technology.

According to an embodiment of the present invention, said AU module comprises a plurality of transcoding units, each configured to receive User Plane data according to a network-based technology and transcode said User Plane data into User Plane data according to a respective point-to-point technology.

According to an embodiment of the present invention, said AU module comprises a selection unit, configured to select, among said transcoding units, a determined transcoding unit to be used for said sidelink connection.

According to an embodiment of the present invention, said selection unit operates according to one or more of the following:
  power/quality estimates related to point-to-point technologies supported by the OBU of said vehicle;
  C-V2X service typologies currently provisioned to said vehicle and surrounding vehicles over respective C-V2X connections;
  actual level of usage of each of the point-to-point technologies implemented within the first RSUG;
  surrounding vehicles' C-V2X service requirements;
  availability of specific point-to-point technology(-ies) onboard of said surrounding vehicles.

BRIEF DESCRIPTION OF THE DRAWINGS

Further features and advantages will appear more clearly from the detailed description of preferred and non-exclusive embodiments of the invention. This description is provided hereinafter with reference to the accompanying illustrative and non-limiting figures, in which.

DESCRIPTION OF EMBODIMENTS OF THE PRESENT INVENTION

Figure 1:
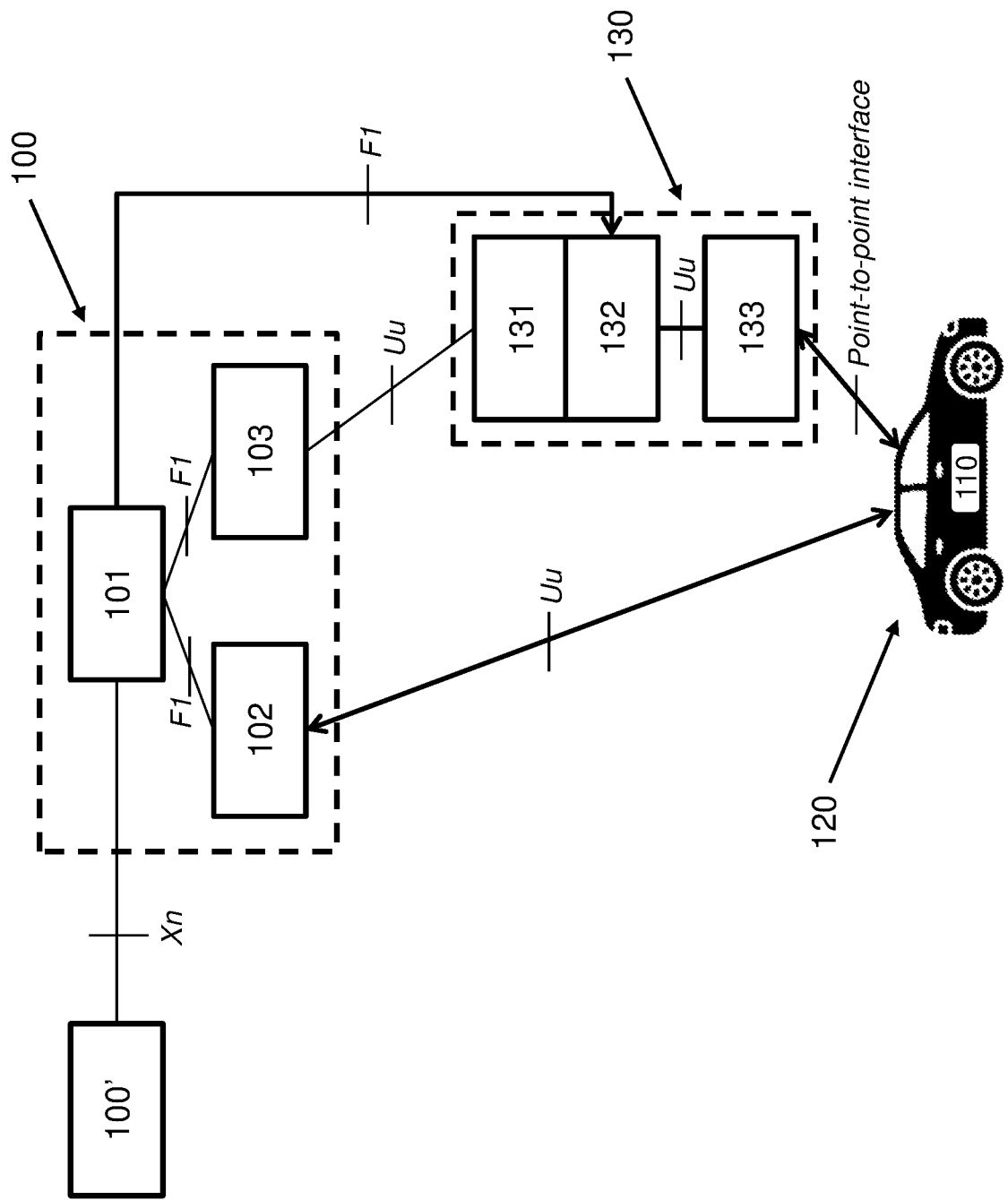
FIG. 1 is a block diagram schematically representing some components of the telecommunications system according to the present invention.

With reference to the accompanying figures, reference numeral 1 identifies a telecommunications system according to the present invention.

System 1 comprises a source Public Land Mobile Network, PLMN 1000 (FIGS. 3-10).

The source PLMN 1000 typically implements a network-based technology in order to allow connection between mobile devices.

By way of example, said network-based technology can be a 3GPP technology, including LTE, NR, and/or possible further developments thereof.

It has to be noticed that the following description, for the sake of simplicity, refers to 3GPP network(s) and technologies. The person skilled in the art will recognize that the invention can be applied, mutatis mutandis, to any possible alternative network(s) and technologies and/or future developments of such network(s) and technologies.

The source PLMN 1000 comprises a plurality of Radio Base Stations, RBSs, spread over the territory in order to provide radio access to the network for mobile devices.

Reference numeral 100 (FIG. 1) indicates a first RBS which, by way of example, will be discussed in the following.

The description provided with reference to the first RBS 100 applies, by way of example, to any other RBS of the source PLMN.

The first RBS 100 is preferably implemented according to a distributed architecture—per se know, briefly disclosed in the following. A different RBS 100' can be implemented according to a monolithic architecture.

The first RSB 100 preferably comprises a Central Unit, CU, 101, and one or more Distributed Units, DU. By way of example, in FIG. 1 a first DU 102 and a second DU 103 are shown. It is understood, however, that the first RBS 100 can be provided with any number of DUs.

For example, the first RSB 100 can be realized as an NG-RAN node, according to section 6.1.1 ("Overall architecture of NG-RAN") of 3GPP technical specification TS 38.401 v 16.3.0.

For example, each DU 102, 103 can be connected to the CU 101 via an F1 interface; reference can be made to section 4 ("General aspects") of 3GPP technical specification TS 38.470 v 16.3.0.

In the framework of Integrated Access and Backhauling, IAB, the first RBS 100 can be seen as an IAB-donor providing access to mobile devices via a network of 3GPP backhaul and access links.

Typically, the source PLMN is managed by a respective first Mobile Network Operator, MNO.

System 1 further comprises a target PLMN 2000 (FIGS. 3-10).

The target PLMN 2000 has substantially the same structure and functioning of the source PLMN 1000, the difference being that the source PLMN is the network on which the vehicle 120 (disclosed in the following) is initially camped, and the target PLMN 2000 is the network to which the same vehicle 120 is attached to after a determined geographic displacement.

The target PLMN 2000 comprises a plurality of Radio Base Stations, RBSs, spread over the territory in order to provide radio access to the network for mobile devices.

Reference numeral 190 indicates, by way of example, a second RBS, belonging to the target PLMN 2000.

Typically, the target PLMN 2000 is managed by a respective second MNO, different from said first MNO.

Preferably, the source PLMN 1000 and the target PLMN 2000 operate in different, neighboring countries, territories or areas. In other terms, a border typically separates the geographic areas in which the source PLMN 1000 and the target PLMN 2000 operate, respectively.

For example, the country in which the source PLMN 1000 operates can be indicated as Country A, and the country in which the target PLMN 2000 operates can be indicated as Country B.

In an embodiment, a road tunnel 180 (or analogous zone/structure wherein coverage of the source PLMN 1000 and target PLMN 2000 might be not available) is interposed between the HPLMN and the VPLMN.

In an embodiment, the source PLMN 1000 can be a Home PLMN, HPLMN. In this case, the vehicle 120 is registered with the first MNO, i.e. the operator that manages the source PLMN 1000. In this embodiment, the target PLMN can be a Visited PLMN, VPLMN.

In an embodiment, the source PLMN 1000 can be a Visited PLMN, VPLMN. In this case, the vehicle 120 is registered with an MNO different than the first MNO, i.e. different than the operator that manages the source PLMN 1000. In this embodiment, the target PLMN can be either a Home PLMN, (the vehicle 120 is registered with the second MNO, i.e. the operator that manages the target PLMN 2000), or a Visited PLMN, VPLMN, different from the source PLMN (the vehicle 120 is registered with an MNO different than the second MNO, i.e. different than the operator that manages the target PLMN 2000).

In view of the above, the following scenarios can occur:

|  | source PLMN | target PLMN |
| --- | --- | --- |
| Scenario # 1 | HPLMN | VPLMN |
| Scenario # 2 | VPLMN | HPLMN |
| Scenario # 3 | VPLMN (*) | VPLMN (*) |

(*) different networks, operated by different MNOs.

The following description will specifically address Scenario #1; however, it is to be noticed that the following description also applies, mutatis mutandis, to Scenario #2 and Scenario #3.

Accordingly, the source PLMN 1000 will now be referred to as Home PLMN (HPLM), and the target PLMN 2000 will be referred to as Visited PLMN (VPLMN).

System 1 further comprises at least a first Road Side Unit Gateway, RSUG, 130. The first RSUG 130 is associated to the HPLMN.

Preferably, System 1 comprises a plurality of RSUGs.

Reference numeral 200 denotes a second RSUG, associated with the VPLMN.

The following description, regarding the first RSUG 130, preferably applies to each other RSUG belonging to System 1.

As schematically shown in FIG. 1, the first RSUG 130 preferably comprises a Mobile Termination, MT, module 131.

The MT module 131 terminates the 3GPP access interface (Uu) to the first RBS 100, and in particular to the DU 103 of said first RBS 100.

Preferably, the MT module 131 uses procedures and behaviors indicated by 3GPP technical specifications for usual mobile devices (UEs), supporting at least the Physical layer, Layer-2, RRC and NAS functionality to connect to one of the DUs 102, 103 of the first RBS 100 (the second DU 103, in the example of FIG. 1), to connect to the CU 101 of the first RBS 100 and the core network, respectively.

Preferably, the first RSUG 130 comprises a Distributed Unit, DU, module 132.

The DU module 132 terminates the 3GPP access interface (Uu) to the AU module 133 (that will be disclosed in the following) and terminates the 3GPP F1 interface to the CU 101 of the first RBS 100.

Figure 2:
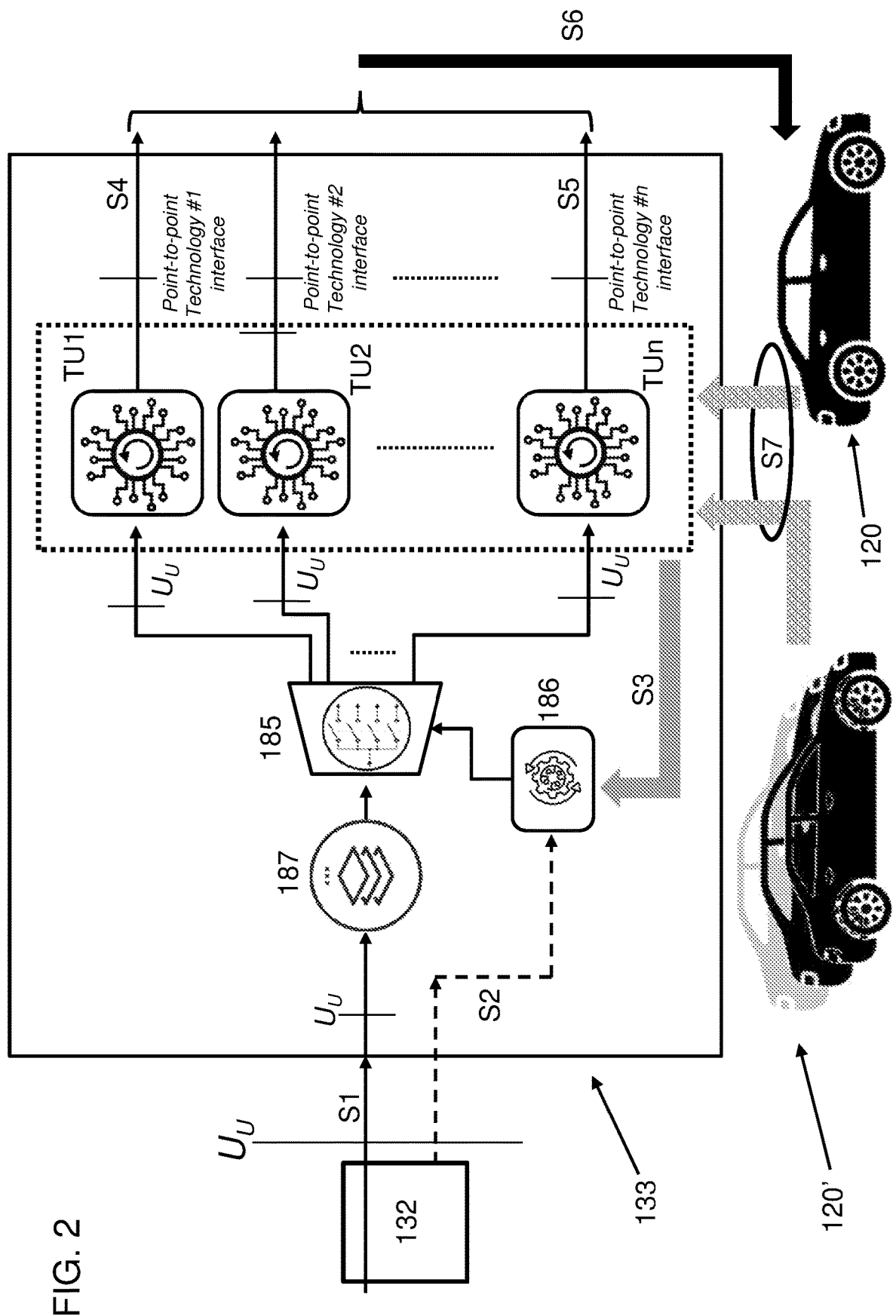
FIG. 2 is a block diagram schematically representing a component of FIG. 1.

Preferably, the first RSUG 130 comprises an Adaptation Unit, AU, module 133 (FIG. 2).

The AU module 133 terminates the 3GPP access interface (Uu) from the DU module 132 and performs a transcoding from a network-based (e.g. 3GPP) communication to a point-to-point technology. The communication based on a point-to-point technology is directed to one or more vehicles.

In general terms, in the framework of IAB, the first RSUG 130 is similar to an IAB-node which provides 3GPP access links to mobile devices and 3GPP backhaul links to the IAB-donor or other IAB-nodes.

Preferably, in order for the first RSUG 130 to properly work within a 3GPP network (i.e. the HPLMN, according to the diagram of FIGS. 3-10) a procedure similar to the IAB node integration (see 3GPP TS 38.401, section 8.12—"IAB-node Integration Procedure") is executed: basically the first RSUG 130 can be seen as an IAB-node wirelessly relaying the communication provided by a 3GPP network node, i.e. the first RBS 100, which can be e.g. either a NR gNB or a LTE ng-eNB in the context of NG-RAN (see 3GPP TS 38.300, section 4.1—"Overall Architecture").

In order to understand the functionalities performed by the AU module 133, an exemplary interaction with vehicle 120 is considered. The AU module 133 is able to interact with vehicle 120 in order to be aware of the point-to-point technology(-ies) actually supported by the vehicle 120 itself (i.e. by the vehicle's On-Board Unit, OBU, 110—FIG. 1); this can be achieved via transmission of point-to-point technology-specific reference signals RS' from the AU module 133 to the vehicle 120 which are then used by the OBU 110 to perform power/quality measurements of the point-to-point technology(-ies) it actually supports. Such power/quality measurements are also performed by the surrounding vehicles 120' in proximity to vehicle 120 and in the coverage area of the AU module 133.

Figure 3:
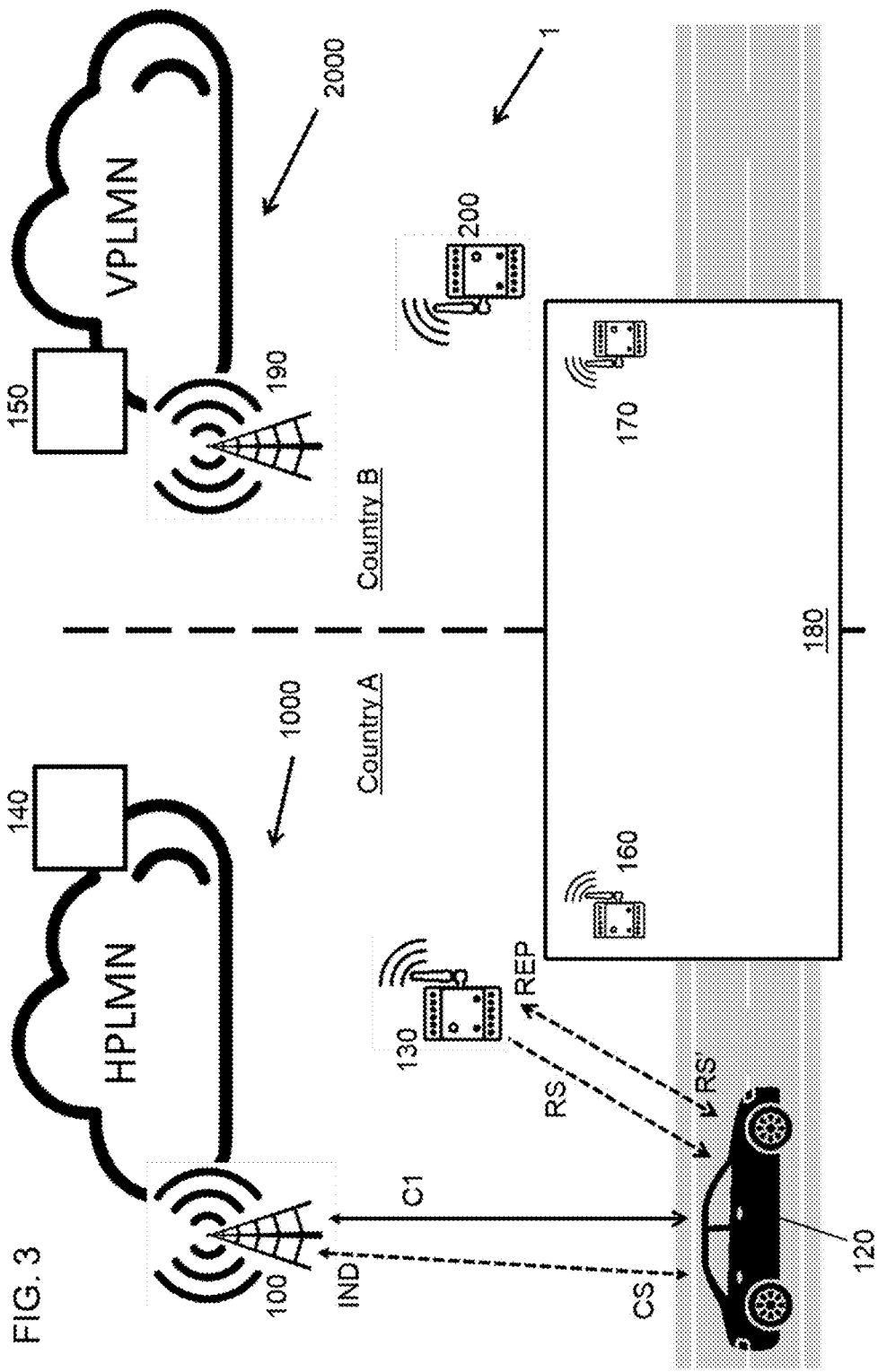
FIG. 3 is a block diagram schematically representing the telecommunications system in accordance with the present invention, in a first functional situation.

Signalling REP in FIG. 3 represents the power/quality measurements reported to the first RSUG 130, and in particular to the AU module 133, by the OBU 110.

The AU module 133 is able to select the most appropriate point-to-point technology(-ies) to be used for transmission of the C-V2X service's data over the radio link established between the AU module 133 and the vehicle 120 by considering one or more of the following:

- the power/quality measurements reporting not only from the vehicle 120 corresponding to the point-to-point technology(-ies) it actually supports, but also from each surrounding vehicle; such information, along with the overall current state of usage of each of the point-to-point technologies implemented within the AU module 133, defines the so-called "Preferred point-to-point technology(-ies)" information (signal S3 in FIG. 2); and
- the C-V2X service typology(-ies) currently provisioned to the vehicle 120 as well as to the surrounding ones (signal S2 in FIG. 2).

Taking into consideration the surrounding vehicles information about their supported point-to-point technology(-ies) allows the AU module 133 to distribute the C-V2X service data transmissions of multiple vehicles among the supported point-to-point technologies as fairly as possible, e.g. by implementing load balancing mechanisms.

Moreover, taking C-V2X service typology(-ies) of all vehicles into consideration allows the AU module 133 to choose point-to-point technology(-ies) which best fit the C-V2X services' requirements (e.g., but not limited to, transmission bandwidth and latency) for each vehicle (i.e. vehicle 120 and the surrounding ones): for instance, in case the vehicle 120 is receiving C-V2X data related to a video streaming service for passengers onboard the vehicle, the AU module 133 is expected to select a point-to-point technology characterized by a very high available transmission bandwidth and very low latency (e.g., but not limited to, LiFi) in order to provide high quality videos. Conversely, in case the vehicle 120 is involved in a C-V2X safety-related service, the AU module 133 is expected to select a point-to-point technology being able to handle small sized data packets transmitted with low latency and high reliability (e.g., but not limited to, ITS-G5) which are typically exchanged among involved vehicles in such kind of C-V2X service.

It is worth to note that the C-V2X service typology is an information which is known at the DU module 132 level (received by the CU 101 of the first RBS 100 over the F1 interface) so that the AU module 133 can be made aware of it in a straightforward manner over the 3GPP Uu interface.

In an embodiment, the reference signals RS' are transmitted from the first RSUG 130 according to non-3GPP technologies (e.g. LiFi, WiFi, Bluetooth, ITS-G5, etc.) only; preferably, the power/quality measurements related thereto are performed by the OBU 110 and reported to the first RSUG 130 in connection with non-3GPP technologies (e.g. LiFi, WiFi, Bluetooth, ITS-G5, etc.) only.

In possible future scenarios, reference signals RS' (and power/quality measurements thereof, aimed to the selection of the most suitable point-to-point technology(-ies)) may also be available for non-network-based 3GPP technologies, such as for example possible developments of PC5 or equivalent technologies.

Besides the point-to-point technology(-ies) identification and selection, the AU module 133 also performs C-V2X service data transcoding which allows the C-V2X service data packets, originally processed for transmission over the 3GPP Uu interface's frame structure, to be adapted to the previously selected, most appropriate point-to-point technology-specific frame structure and format. Note that the AU module 133 is able to perform such data transcoding function of multiple C-V2X data flows towards multiple point-to-point technology-specific frame structures and formats (S4 and S5 in FIG. 2), such multiple C-V2X data flows being either associated to the same vehicle (e.g. the Vehicle 120 is provisioned with multiple C-V2X services simultaneously, for instance video streaming service for passengers onboard the vehicle and safety-related service) or to distinct vehicles potentially equipped with different point-to-point technology(-ies) and served by the same RSUG supporting such point-to-point technology(-ies).

Accordingly, the AU module 133 module comprises a plurality of transcoding units TU1-TUn, each configured to receive User Plane data according to a network-based (e.g. 3GPP) technology and transcode said User Plane data into User Plane data according to a respective point-to-point technology.

The AU module 133 is also provided with a selection unit 185, configured to select, among said transcoding units TU1-TUn, a determined transcoding unit to be used for communication with the OBU 110.

Advantageously, the selection unit 185 is controlled by a control unit 186.

The control unit 186 receives as input information regarding the "Preferred point-to-point technology(-ies)", signal S3 in FIG. 2, and the "Vehicles' overall C-V2X service typology(-ies)", signal S2 in FIG. 2, in order to send proper control signals to the selection unit 185.

As shown in FIG. 2, the C-V2X service data flow(s) related to the vehicle 120, along with related C-V2X service typology(-ies) information of all the vehicles (i.e. vehicle 120 and the surrounding ones), is the input sent by the DU module 132 to the AU module 133 over a 3GPP Uu interface.

The C-V2X service data are then transcoded, by means of the selected transcoding unit into another frame structure(s) and format(s) corresponding to the previously selected, most appropriate point-to-point technology(-ies) for the vehicle 120.

Preferably, the AU module 133 is provided with a buffer module 187 which stores the C-V2X service data packets received from the DU module 132 over the 3GPP Uu interface—in turn received by the DU module 132 over the second C-V2X connection C2 (which will be disclosed in the following). In case the AU module 133 is not able to send these packets to the vehicle 120 over a point-to-point technology due to, e.g. (but not limited to), the OBU 110 not supporting either of the point-to-point technology(-ies) implemented within the AU module 133 or the vehicle 120 being not in good radio and/or visibility conditions for either of the point-to-point technology(-ies) it supports, then the C-V2X service data packets will be discarded by the AU module 133 after the expiration of a dedicated validity timer linked to the buffer module.

With reference to FIG. 2:

- signal S1 represents the 3GPP-based data flows for vehicle 120, said data having a specific data frame structure and format;
- signal S2 represents the vehicles' overall C-V2X service typology(-ies) information;
- signal S3 represents information regarding the preferred point-to-point technology(-ies);
- signal S4 represents output data for the vehicle 120, according to a first point-to-point technology, such output data having specific data frame structure and format;
- signal S5 represents output data for the vehicle 120, according to an n-th point-to-point technology, such output data having specific data frame structure and format;

signal S6 represents the actual C-V2X service data related to vehicle 120 sent over the selected point-to-point technology(-ies);

signal S7 represents power/quality measurements reporting for each of the point-to-point technology.

In a preferred embodiment, System 1 further comprises one or more Road Side Units, RSUs.

By way of example, a first RSU 160 and a second RSU 170 are shown in FIGS. 3-9. The exemplary embodiment of FIG. 10, which will be described in the following, does not include RSUs.

Each RSU 160, 170 supports one or more point-to-point technologies (e.g. LiFi, WiFi, Bluetooth, PC5, ITS-G5, etc.).

Each RSU 160, 170 is configured to communicate with vehicles and/or with other RSUs (or RSUGs) based on said point-to-point technologies.

The RSU 160, 170 are arranged in a border area between the HPLMN and the VPLMN. For example, the RSUs can be located in the aforesaid road tunnel 180 so as to provide connectivity to vehicles, even if coverage of the HPLMN and the VPLMN is not available.

A vehicle 120, provided with the aforementioned OBU, 110 cooperates with the System 1.

Generally speaking, multiple vehicles can be considered in the context of the present invention. For the sake of clarity, reference will be made to the aforesaid vehicle 120 and to "surrounding vehicles" 120' which operate in the vicinity of the vehicle 120.

It is understood that the following description, regarding the vehicle 120, applies also to each of the surrounding vehicles 120'.

The OBU 110 of vehicle 120 supports a network-based connection (e.g. a 3GPP connection, such as LTE, NR, etc.) and one or more point-to-point connections (e.g. LiFi, Wifi, Bluetooth, PC5, ITS-G5, etc.).

In order to operate in the 3GPP cellular environment, the OBU is provided with a Universal Subscriber Identity Module (USIM) card or with another subscriber identity module, such as an eSIM.

Network-based (e.g. 3GPP) connectivity is used by the OBU to communicate with the first RBS 100, for example with the first DU 102 (FIG. 1).

Sidelink connectivity is used by the OBU to communicate with the first RSUG 130 and, preferably, as part of the sidelink connection, with the first and second RSUs 160, 170 (FIGS. 3-9).

In an embodiment, the OBU can support a plurality of point-to-point technologies. In such case, the first RSUG 130, and in particular the AU module 133, will select the point-to-point technology to be used.

System 1 provides C-V2X services to the vehicle 120, and in particular to its OBU 110. When the vehicle 120 is attached to the HPLMN, C-V2X services are provided via the first RBS 100, the first RSUG 130 and preferably the RSUs 160, 170. When the vehicle is attached to the VPLMN, C-V2X services are provided via the second RBS 190.

In FIGS. 3-9, dashed line connections represent signalling, whereas solid line connections represent User Plane data exchange. The same also applies to FIG. 10, which is disclosed in the following.

The present invention allows the vehicle 120 to move from an area covered by the HPLMN to an area covered by the VPLMN with substantial connection and service continuity.

It has to be noted that the present description and the following claims are specifically directed to the C-V2X technology, the invention can also be applied to possible other cellular network-based technologies, adapted to provide communication between a vehicle and one or more other entities. For example, in the Applicant's opinion the present invention could be applied to possible future developments and/or extensions of the C-V2X technology. Accordingly, the expressions "C-V2X", "C-V2X connection", "C-V2X technology", "Cellular Vehicle-to-Everything", and similar, in the present description and claims, are not meant to cover only any specific standard identified as C-V2X, and are rather to be interpreted so as to include also alternative technologies, including the above mentioned developments and/or extensions.

In an initial situation (FIG. 3), a first C-V2X connection C1 is established between the first RBS 100 (in particular the first DU 102) and the OBU 110. Preferably, the first C-V2X connection C1 is a network-based (e.g. 3GPP) connection. As said, such connection can be, for example, an LTE connection, a NR connection, etc.

In an embodiment (corresponding to Scenario #1, which is specifically addressed by the present description), the OBU 110 is a subscriber of the first MNO, i.e. the MNO that manages the HPLMN. In other embodiments, as explained above, the OBU 110 can be a subscriber of an MNO different from the MNO that manages the source PLMN 1000.

A C-V2X service is provisioned to the OBU 110 over the first C-V2X connection C1. Such C-V2X service includes an exchange of User Plane data between the first RBS 100 and the OBU 110.

The OBU makes use of C-V2X service handled by a first Application Server, AppServ, 140, via the HPLMN. The same C-V2X service can be provided by a second AppServ 150, via the VPLMN, in the coverage area of the VPLMN.

The vehicle 120 approaches a border zone wherein coverage of the HPLMN is no more available. For example, the vehicle 120 approaches a geographic border with another country. In order to avoid harmful interruptions of the User Plane connectivity, it is necessary to ensure service continuity to the vehicle 120 while crossing the border. As said, in certain situations the scenario might also be more challenging, e.g. due to the presence of a road tunnel in the border zone.

Preferably, the CU 101 of the first RBS 100 transmits to the vehicle 120 a configuration signal CS for configuring the OBU 110 to perform power and/or quality measurements of neighbor RSUGs.

Based on said power and/or quality measurements, performed by the OBU 110 by exploiting network-based reference signals RS (e.g. 3GPP reference signals) sent from each RSUG and then reported to the RBS 100 (indication signal IND), the RBS 100 selects the first RSUG 130 as the most appropriate RSUG among the available RSUGs being able to communicate with the HPLMN the vehicle is subscribed to.

Furthermore, each RSUG sends specific point-to-point technology-specific reference signals RS' from RSUG 130 to OBU 110, in particular from the AU 133, which are then employed by the OBU 110 to perform power/quality measurements of the point-to-point technology(-ies) it actually supports. Such power/quality measurements are also performed by the surrounding vehicles in proximity to vehicle 120.

In case the OBU 110 supports more than one point-to-point technologies, the first RSUG 130 selects the most suitable point-to-point technology to be used for communicating with the OBU 110.

Such selection is preferably performed based on one or more of the following:
- power/quality estimates related to point-to-point technologies supported by the OBU 110 of vehicle 120;
- C-V2X service typologies currently provisioned to the vehicle 120 and surrounding vehicles over respective C-V2X connections;
- actual level of usage of each of the point-to-point technologies implemented within the first RSUG 130;
- surrounding vehicles' C-V2X service requirements;
- availability of specific point-to-point technology(-ies) onboard of said surrounding vehicles.

Figure 4:
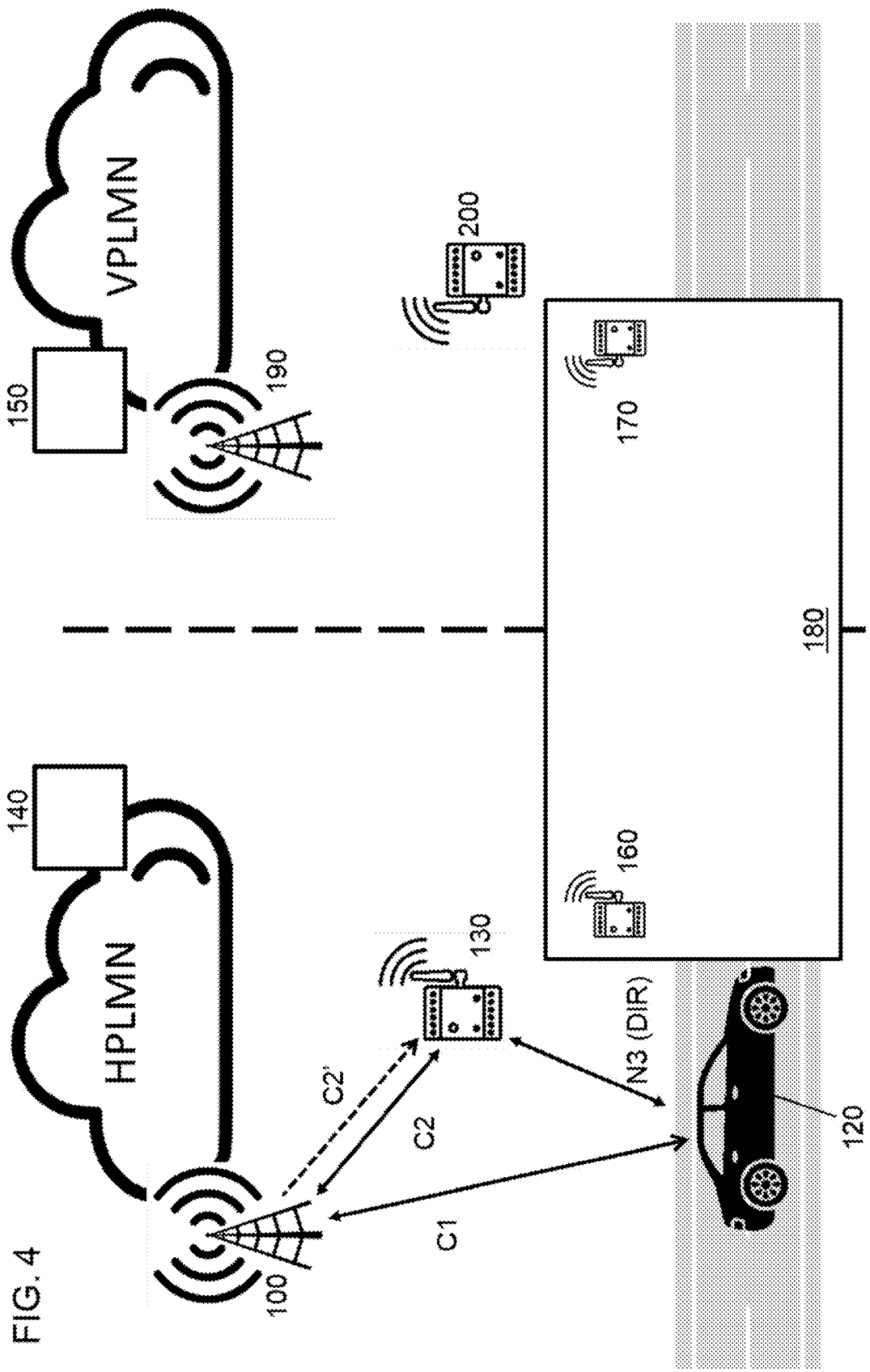
FIG. 4 is a block diagram schematically representing the telecommunications system in accordance with the present invention, in a second functional situation.

The first RSUG 130 then establishes a second C-V2X connection C2 with the first RBS 100 (FIG. 4).

Reference C2' denotes the signalling employed to establish such second C-V2X connection C2.

Preferably, the second C-V2X connection C2 is a network-based (e.g. 3GPP) connection. Such connection, for example, can be an LTE connection, a NR connection, etc.

The C-V2X service provisioned over the first C-V2X connection C1 is also provisioned over the second C-V2X connection C2.

Over the second C-V2X connection C2 User Plane data—regarding said C-V2X service—are exchanged, which are the same User Plane data exchanged over the first C-V2X connection C1.

Preferably, a data duplication functionality within the Packet Data Convergence Protocol (PDCP) layer located in the CU 101 of the first RBS 100 is exploited (see 3GPP TS 38.323, section 5.11 "PDCP duplication").

The first RSUG 130 also establishes a sidelink connection N3 with the OBU 110, preferably based on the point-to-point technology selected as disclosed above.

Initially, the sidelink connection N3 is preferably realized as a direct link DIR between the first RSUG 130 and the OBU 110.

Over the sidelink connection N3, User Plane data are exchanged, which are the same User Plane data exchanged over the second C-V2X connection C2.

Accordingly, the OBU 110 can receive/transmit the same C-V2X data over the first C-V2X connection C1 and the sidelink connection N3 (via the second C-V2X connection C2).

Preferably, the second C-V2X connection C2 is always established, even in case the AU module 133 is not able to send/receive the duplicated C-V2X service data packets associated to such second C-V2X connection C2 to/from the vehicle 120 over the point-to-point technology(-ies) due to, e.g. (but not limited to) the vehicle 120 not supporting either of the point-to-point technology(-ies) implemented within the AU module 133 or the vehicle 120 being not in good radio and/or visibility conditions for either of the point-to-point technology(-ies) it supports. In this connection, the above mentioned buffer module 187 can be used; as said, in case the AU module 133 is not able to send these packets to the vehicle 120 over the point-to-point technology(-ies) they will be discarded by the AU module 133 after the expiration of a dedicated validity timer linked to the buffer module 187.

During operation of System 1, dropping of the first C-V2X connection occurs.

In an embodiment, dropping is caused by the connection being lost, for example because the vehicle 120 progressively moves away from the first RBS 100, reaching a position outside the coverage area of the same first RBS 100.

In an embodiment, dropping is caused by a release operation, preferably carried out by the OBU. The release operation can be based on the OBU specific implementation.

In an example, the first C-V2X connection C1 is released by the OBU 110 upon reception, by the OBU 110, of the first data packet over the sidelink connection N3, and in particular the direct link DIR. Upon such reception, the OBU 110 can send a radio link failure indication to the first RBS 100 for releasing the first C-V2X connection C1. In another example, upon reception of the first data packet over the sidelink connection N3 (direct link DIR), the OBU 110 activates a timer; after a determined time, defined by said timer and indicative of a time period over which the second C-V2X connection and the sidelink connection N3 overlap with the first C-V2X connection, the OBU transmits a radio link failure indication to the first RBS 100 for releasing the first C-V2X connection C1.

However, the second C-V2X connection C2 and the sidelink connection N3 are still active, thus the OBU 110 is still in communication with the first RBS 100 via the direct link DIR and the first RSUG 130.

Accordingly, the C-V2X service which was provisioned via both the first C-V2X connection C1 and the second C-V2X connection C2 is now provisioned over the second C-V2X connection C2 (via the sidelink connection N3) only.

In an embodiment, as said above, the sidelink connection N3 can be enhanced by means of one or more Road Side Units RSUs.

By way of example, the first RSU 160 and the second RSU 170 are shown in FIGS. 3-9.

It has to be noted that any number of RSUs can be provided in System 1, basically depending on the length of the tract which is covered neither by the HMPLMN nor by the VPLMN—for example, the length on the road tunnel 180 which the vehicle 120 may enter.

Figure 5:
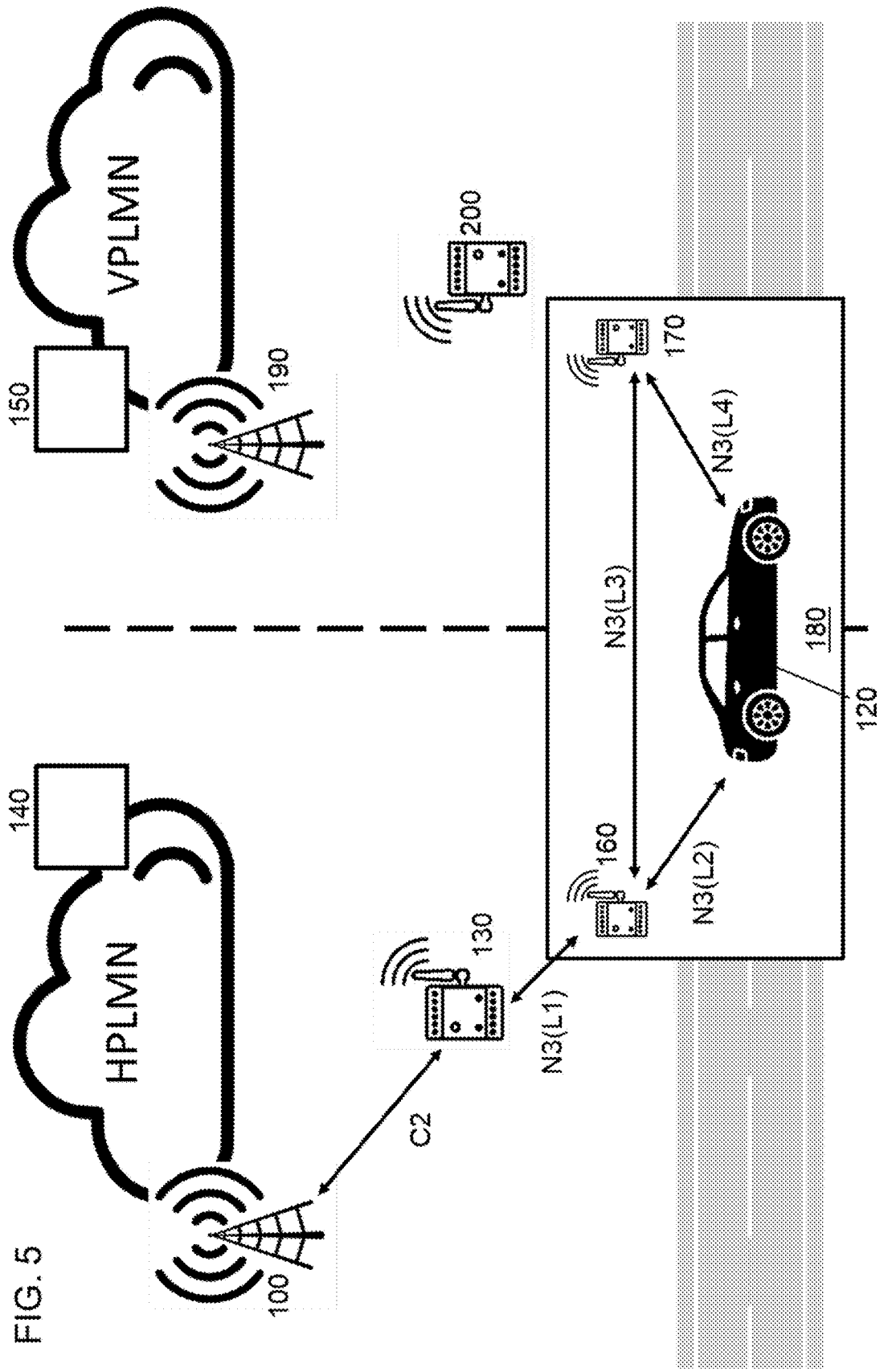
FIG. 5 is a block diagram schematically representing the telecommunications system in accordance with the present invention, in a third functional situation.

As schematically shown in FIG. 5, preferably, a first communication link L1 is established, as part of the sidelink connection N3, between the first RSUG 130 and the first RSU 160.

In an embodiment, the first communication link L1 is based on a point-to-point technology.

In an embodiment, the first communication link L1 is based on a cabled technology.

User Plane data exchanged over the first communication link L1 are the same User Plane data exchanged over the second C-V2X connection C2.

Preferably, a second communication link L2 between the OBU 110 of the vehicle 120 and the first RSU 160 is established, as part of the sidelink connection N3.

The second communication link L2 is based on a point-to-point technology.

Preferably, the second communication link L2 is based on the same point-to-point technology as the direct link DIR (FIG. 4). User Plane data exchanged over the second communication link L2 are the same User Plane data exchanged over the first communication link L1.

In an embodiment, the OBU can receive the same C-V2X service via the direct link DIR and the second communication link L2 (via the first communication link L1) as part of the sidelink connection N3.

Thus, when the direct link DIR is released, the sidelink connection N3 still includes the first and second communication links L1, L2 so that exchange of User Plane data between the first RBS 100 and the OBU 110 of vehicle 120 can still be obtained based on said first and second communication links L1, L2 and the second C-V2X connection C2.

In an embodiment, the direct link DIR can coexist with the first and second communication links L1, L2 for a certain time, for example in order to allow a safe transition from the communication based on the direct link DIR and the communication based on the first and second communication links L1, L2.

In an embodiment, a path switch is performed from the direct link DIR to the first and second communication links L1, L2, so that the direct link DIR does not substantially overlap in time with the first and second communication links L1, L2.

The Applicant observes that the transition from the direct link DIR and the first and second communication links L1, L2 is preferably handled based on the specific point-to-point technology(-ies) employed.

Preferably, a third communication link L3 is established, as part of the sidelink connection N3, between the first RSU 160 and the second RSU 170.

In an embodiment, the third communication link L3 is based on a point-to-point technology.

In an embodiment, the third communication link L3 is based on a cabled technology.

In an embodiment, the third communication link L3 is based on the same communication technology, preferably a cabled technology or a point-to-point technology, as the first communication link L1.

User Plane data exchanged over the third communication link L3 are the same User Plane data exchanged over the second C-V2X connection C2.

Preferably, a fourth communication link L4 is established, as part of the sidelink connection N3, between the OBU 110 of the vehicle 120 and the second RSU 170.

The fourth communication link L4 is based on a point-to-point technology.

Preferably, the fourth communication link L4 is based on the same point-to-point technology as the direct link DIR and/or the second communication link L2 (FIG. 4).

User Plane data exchanged over the fourth communication link L4 are the same User Plane data exchanged over the first communication link L1.

Accordingly, the OBU can receive the same C-V2X service over the second communication link L2 and the fourth communication link L4 (via the third communication link L3).

Figure 6:
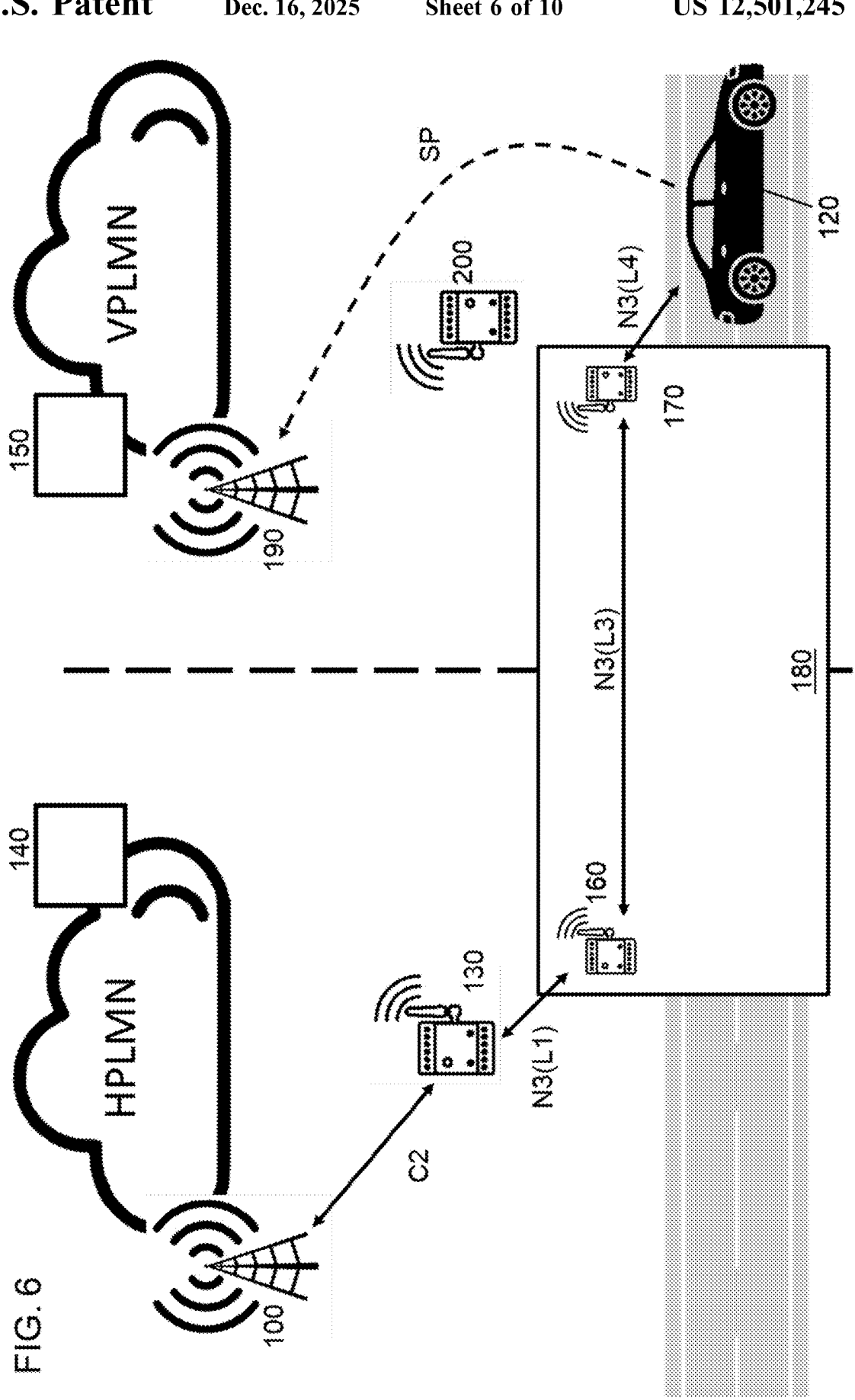
FIG. 6 is a block diagram schematically representing the telecommunications system in accordance with the present invention, in a fourth functional situation.
Figure 7:
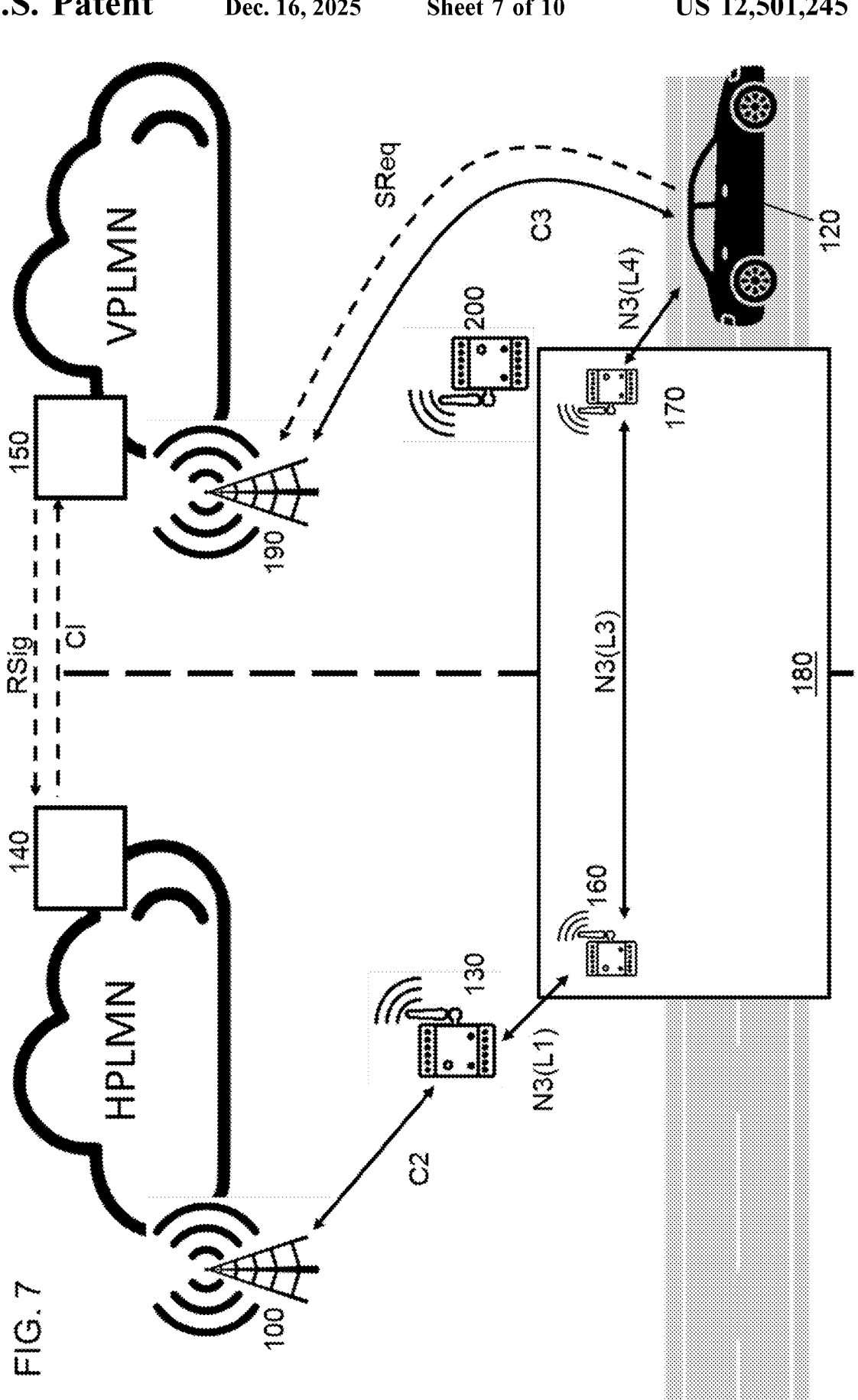
FIG. 7 is a block diagram schematically representing the telecommunications system in accordance with the present invention, in a fifth functional situation.

Thus, when the second communication link L2 is released, the sidelink connection N3 still includes the first, third and fourth communication links L1, L3, L4 and exchange of User Plane data between the first RBS 100 and the OBU 110 of vehicle 120 is obtained based on said first, third and fourth communication links L1, L3, L4 and the second C-V2X connection C2 (FIG. 6).

Regarding the communication technology(-ies) to be used in the sidelink connection N3, in an example the direct link DIR is based on the same point-to-point technology(-ies) as the second communication link L2 and/or the fourth communication link L4; preferably, the first communication link L1 is based on the same (cabled and/or point-to-point) communication technology(-ies) as the third communication link L3.

In an example, the communication technology(-ies) used for the direct link DIR, second communication link L2 and/or fourth communication link L4 is/are different from the communication technology(-ies) used for the first and/or third communication link L3, e.g., but not limited to, for reducing possible interferences.

After the vehicle 120 crosses the border and, for example, exits the abovementioned road tunnel 180, the OBU 110, while continuing to receive the C-V2X service from the HPLMN, starts a network selection process (signalling SP in FIG. 6) in order to camp in the VPLMN. Reference can be made, in this connection, to 3GPP TS 38.304, section 5.1.1—"Support for PLMN selection" and section 5.2—"Cell selection and reselection for NR radio access").

Once camped and being in good coverage conditions in the VPLMN (FIG. 7), the OBU 110 triggers a service request SReq towards the second AppServ 150, via the access network of the VPLMN (i.e. via the second RBS 190).

This is needed in order for the vehicle to continue User Plane communications related to the C-V2X service via the VPLMN only: to this end, the service-related OBU context is gathered from the first AppServ 140 by exploiting application-level interactions between the first and second AppServs 140, 150.

In particular, the second AppServ 150 sends to the first AppServ 140 a request signal RSig, including a request for C-V2X context information C1.

The C-V2X context information C1 comprises the context of the OBU 110 related to the C-V2X service provisioned over the second C-V2X connection C2. The first AppServ 140, in response, sends to the second AppServ 150 the requested C-V2X context information C1, so that a third C-V2X connection C3 can be established, between the second RBS 190 of the VPLMN and the OBU 110 of the vehicle 120.

By way of example, the context information C1 can include one or more of the following: capabilities of the OBU 110; typology of C-V2X service(s) provisioned; policy rules; restrictions; etc.

Preferably, the third C-V2X connection C3 is a network-based (e.g. 3GPP) connection. Such connection can be, for example, an LTE connection, a NR connection, etc.

At the same time, the vehicle keeps the User Plane connection with the HPLMN by means of the sidelink connection N3 (formed by the fourth, third and first communication links L4, L3, L1) and the second C-V2X connection C2 with the intermediation of the first RSUG 130 which interfaces with the first RBS 100 in the HPLMN.

Now the OBU 110 of the vehicle 120 is able to transmit (receive) data to (from) the second AppServ 150 in the VPLMN via the third C-V2X connection C3.

Figure 8:
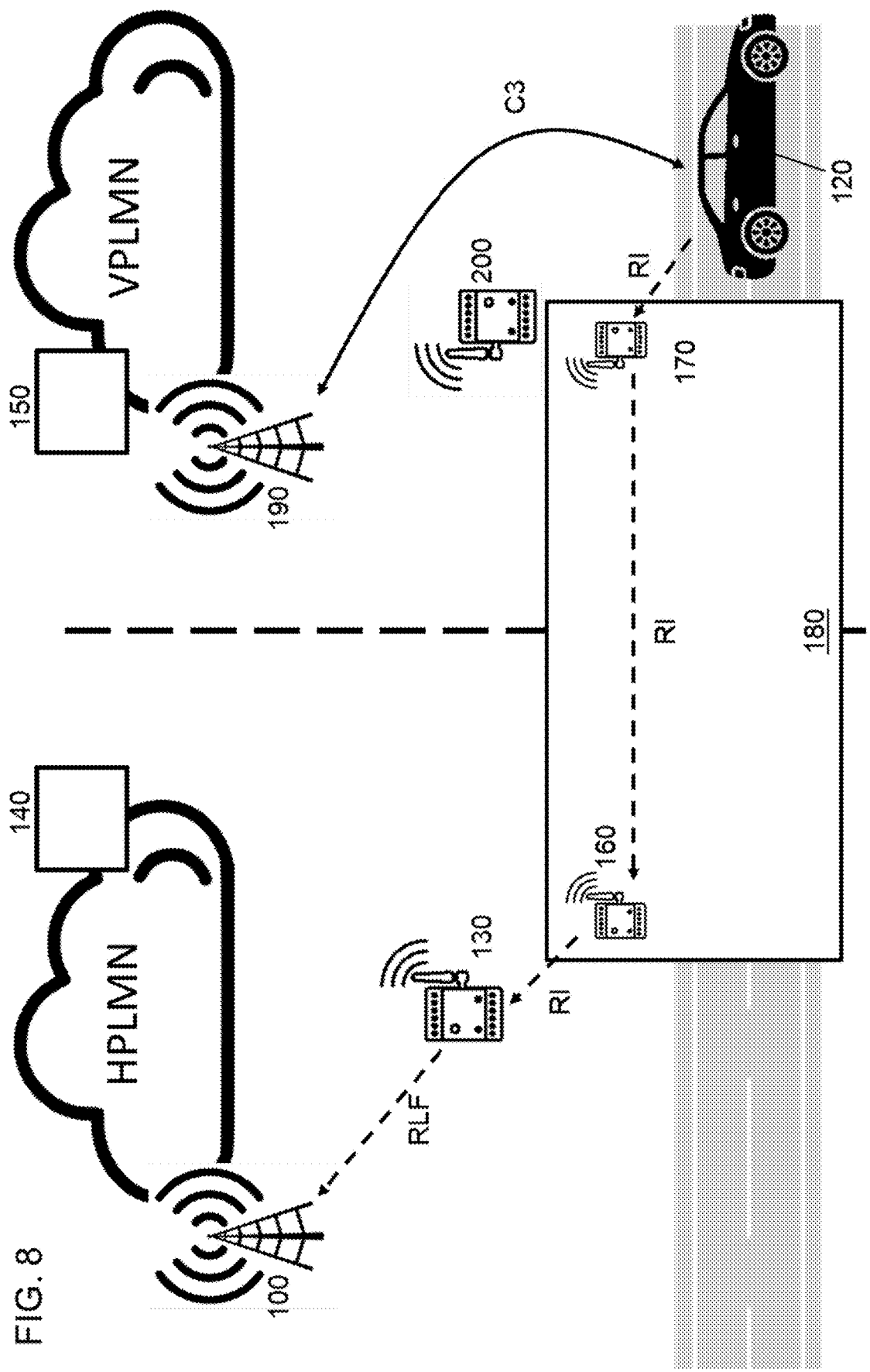
FIG. 8 is a block diagram schematically representing the telecommunications system in accordance with the present invention, in a sixth functional situation.

Following the establishment of the third C-V2X connection C3 for C-V2X User Plane data traffic, the vehicle 120 (i.e. OBU 110) starts receiving/transmitting C-V2X service's data over such User Plane connection with the VPLMN and such data reception triggers the release of the second C-V2X connection C2 (FIG. 8).

The OBU 110 is thus configured to send, to the first RSUG 130, a release indication RI for release of the second C-V2X connection C2. More in detail, the reception of data packet (s), e.g. at least the first data packet, sent over the third C-V2X connection C3 with the VPLMN, triggers the transmission of said release indication RI.

The release indication RI is received by the AU module 133 of the first RSUG 130. Such indication—which is specific of the point-to-point technology(-ies) being used for the communication among the RSUs 160, 170 and with the first RSUG 130—is then converted by the AU 133 into a radio link failure indication RLF.

The first RSUG 130, and in particular the DU 132, then sends to the first RBS 100, over the F1 interface, the radio link failure indication RLF, triggered—as said—by the release indication RI, to release the second C-V2X connection C2.

Reference can be made, in this connection, to 3GPP TS 38.300, section 9.2.7 "Radio Link Failure".

The radio link failure indication RLF also causes the release of the C-V2X service context related to the OBU 110 at the application level, in particular at the first AppServ 140 in the HPLMN.

Figure 9:
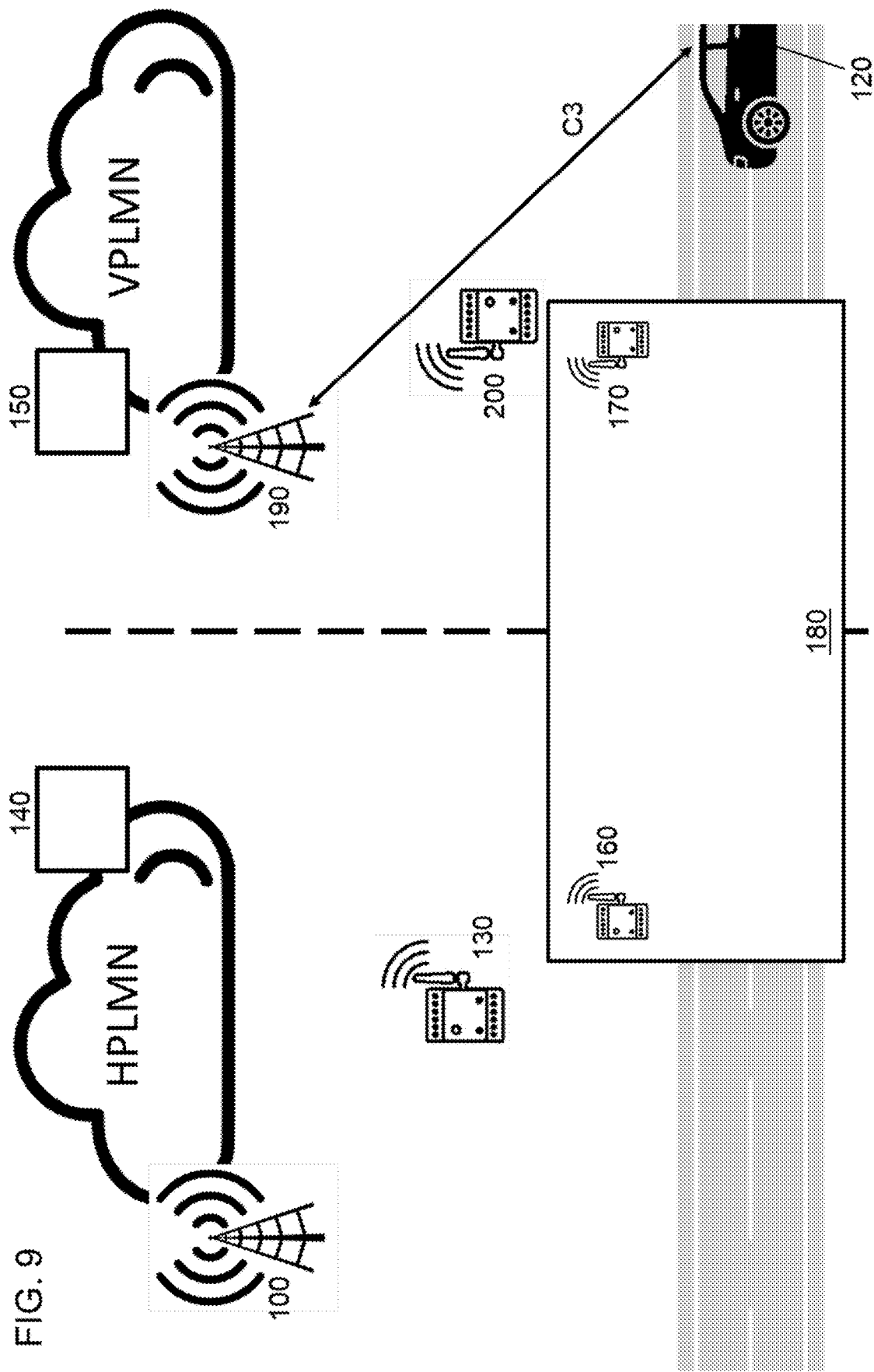
FIG. 9 is a block diagram schematically representing the telecommunications system in accordance with the present invention, in a seventh functional situation.
Figure 10:
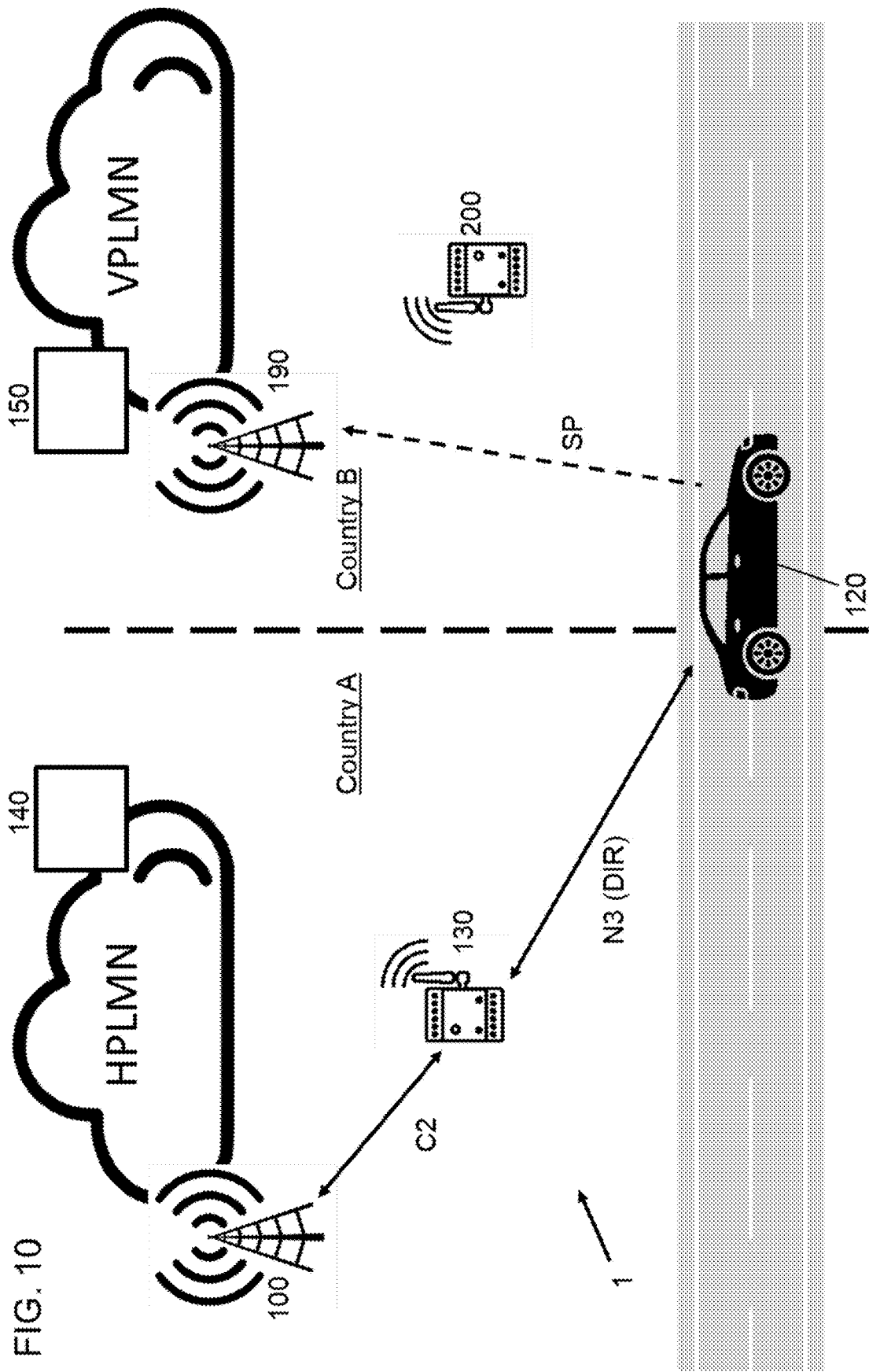
FIG. 10 is a block diagram schematically representing a functional situation of another embodiment of the telecommunications system according to the present invention.

FIG. 9 represents the target situation where the vehicle 120 is served by the VPLMN only, with the VPLMN being able to provide the same C-V2X service as requested by the vehicle 120 while it was in the HPLMN and also fulfilling the same Quality-of-Service requirements.

Note that the second RSUG 200 is preferably not used for the purpose of service continuity while the vehicle 120 moves from the HPLMN to the VPLMN—i.e. moves from left ("Country A") to right (Country B") in the diagrams shown in the attached figures. The second RSUG 200 will be used in the opposite situation, that is, while the vehicle moves from right to left (i.e. from Country B to Country A)—situation in which the first RSUG 130 is not used.

In addition, it is worth to note that the method and system herein disclosed can be easily extended in a multi-operator scenario, i.e. multiple MNOs operating in Country A and/or Country B. This can be achieved by either allowing instantiation of multiple DUs within the same RSUG, each DU belonging to a certain MNO, or by deploying a dedicated RSUG for each MNO involved in such multi-operator scenario. All the RSUs used for multi-hop relaying of the second C-V2X connection C2 to the vehicle established via the first RSUG are not impacted at all and can be seen as MNO-independent as they can transmit C-V2X service data flows of multiple MNOs only depending on the selected point-to-point technology(-ies) being used by the RSUs.

As said above, the RSUs and/or the possible road tunnel 180 belong to a preferred embodiment of the invention.

In an embodiment (FIG. 10), the first RSUG 130 can be sufficient in order to support the transition from the HPLMN to the VPLMN. In other terms, the point-to-point segment of the communication between the OBU 110 and the first RBS 100 can be based on the direct link DIR only: when the direct link DI R is still active, the OBU 110 reaches the coverage area of the VPLMN and, while still receiving C-V2X service from the HPLMN via the first RSUG 130 (i.e. the second C-V2X connection C2 and the direct link DIR), the OBU 110 starts the selection of a new PLMN (by means of signalling SP, which is the same as in FIG. 6), selecting the aforesaid VPLMN and establishing the third C-V2X connection C3—also thanks to the cooperation of the first and second AppServ 140, 150. The same operations schematically shown in FIGS. 7-8 will be carried out also in this embodiment, the only difference being that the OBU 110 directly communicates with the first RSUG 130 over the direct link DIR so that, for example, the release indication RI is transmitted over the direct link DIR and not over the communication links L1, L3, L4 (the latter not being established, since—as said—the RSUs are not provided). Finally, the same scenario as FIG. 9 will be obtained, wherein the vehicle receives C-V2X service via the VPLMN only.

The invention achieves important advantages.

In fact, a substantial connection and service continuity (seamlessness) is provided, without any invasive modifications to the network entities.

In particular, no roaming interfaces (S10 for the EPS, N14 for the 5GS) are necessary, among a potentially high number of PLMNs, hence saving CAPital and OPerational EXpenditures (CAPEX and OPEX) for the involved operators.

Furthermore, it is not necessary declaring all the involved PLMNs as "Equivalent".

In addition to the above, no additional and/or specific RAN configurations have to be considered in order to implement the invention with respect to what is specified in relevant standards.

A further advantage is achieved in that the invention allows avoiding extensions to already existing roaming agreements as it would otherwise be needed due to the sensitive network-related information to be shared among involved operators.

The invention claimed is:

1. A method for managing a Cellular Vehicle-to-Everything, C-V2X, connection comprising:
    establishing a first C-V2X connection between a first Radio Base Station, RBS of a source Public Land Mobile Network, PLMN and an electronic On-Board Unit, OBU of a vehicle, wherein a C-V2X service is provisioned to said OBU over said first C-V2X connection;
    establishing a second C-V2X connection between said first RBS and a first Road Side Unit Gateway, RSUG, wherein the C-V2X service provisioned over said first C-V2X connection is also provisioned over said second C-V2X connection;
    establishing a sidelink connection between said first RSUG and said OBU, wherein, over said sidelink connection, User Plane data are exchanged which are the same User Plane data exchanged over said second C-V2X connection;
    at a first Application Server, AppServ, of said source PLMN, receiving from a second App Serv, of a target PLMN, a request signal, including a request for C-V2X context information, said C-V2X context information comprising a context of said OBU related to the C-V2X service provisioned over said second C-V2X connection;
    sending, from said first AppServ, to said second AppServ, said C-V2X context information.

2. The method according to claim 1 wherein, after establishing said sidelink connection, dropping of said first C-V2X connection occurs.

3. The method according to claim 1, further comprising:
    at said first RSUG, receiving from said OBU, over said sidelink connection, a release indication for release of said second C-V2X connection;
    at said first RBS, receiving from said first RSUG a radio link failure indication, triggered by said release indication, to release said second C-V2X connection.

4. The method according to claim 1, further comprising sending, from said first RBS to said OBU, a configuration signal for configuring said OBU to perform power and/or quality measurements of neighbor Road Side Unit Gateways, RSUGs
    wherein the method further comprises:
    receiving, at said first RBS, from said OBU, an indication signal representative of said power and/or quality measurements;
    selecting, at said RBS, said first RSUG among said neighbor RSUGs based on said indication signal.

5. The method according to claim 1, comprising transcoding User Plane data sent from said first RBS to said first RSUG according to a network-based technology through said second C-V2X connection into User Plane data according to a point-to-point technology to be sent to said OBU over said sidelink connection.

6. The method according to claim 1, wherein said first RSUG supports multiple point-to-point technologies, the method comprising selecting, at said first RSUG, among said multiple point-to-point technologies, a determined point-to-point technology for data exchange between said first RSUG and said OBU over said sidelink connection.

7. The method according to claim 6 wherein said selecting is performed based on one or more of the following:
   power and/or quality estimates related to point-to-point technologies supported by the OBU of said vehicle;
   C-V2X service typologies currently provisioned to said vehicle and surrounding vehicles over respective C-V2X connections;
   actual level of usage of each of the point-to-point technologies implemented within the first RSUG;
   surrounding vehicles' C-V2X service requirements;
   availability of specific point-to-point technology onboard of said surrounding vehicles.

8. The method according to claim 1, further comprising, while said second C-V2X connection and said sidelink connection are active, establishing a third C-V2X connection between the OBU of said vehicle and said target PLMN.

9. The method according to claim 3, wherein said release indication is sent from the OBU of said vehicle to the first RSUG after said third C-V2X connection is established.

10. The method according to claim 1, wherein said sidelink connection comprises a direct link between the OBU and the first RSUG, the method further comprising:
   establishing, as part of said sidelink connection, a first communication link between the first RSUG and a first Road Side Unit, RSU, associated with said first RSUG, wherein User Plane data exchanged over said communication link are the same User Plane data exchanged over said second C-V2X connection;
   establishing, as part of said sidelink connection, a second communication link between the OBU of said vehicle and said first RSU, said second communication link being based on a point-to-point technology, wherein User Plane data exchanged over said second communication link are the same data exchanged over said first communication link.

11. The method according to claim 10, wherein, when the direct link is released, exchange of User Plane data between the first RBS and the OBU of said vehicle is obtained based on said first and second communications links and said second C-V2X connection.

12. The method according to claim 10, further comprising:
   establishing, as part of said sidelink connection, a third communication link between the first RSU and a second RSU, wherein User Plane data exchanged over said third communication link are the same User Plane data exchanged over said second C-V2X connection;
   establishing, as part of said sidelink connection, a fourth communication link between the OBU of said vehicle and said second RSU, said fourth communication link being based on a point-to-point technology, wherein User Plane data exchanged over said fourth communication link are the same User Plane data exchanged over said first communication link.

13. The method according to claim 12, wherein, when the second communication link is released, exchange of User Plane data between the first RBS and the OBU of said vehicle is obtained based on said first, third and fourth communication links and the second C-V2X connection.

14. A telecommunications system for managing a Cellular Vehicle-to-Everything, C-V2X, connection comprising:
   a first Radio Base Station, RBS, of a source Public Land Mobile Network, PLMN, for establishing a first C-V2X connection with an electronic On-Board Unit, OBU, of a vehicle;
   at least a first Road Side Unit Gateway, RSUG; wherein said first RBS is configured for establishing a second C-V2X connection with said first RSUG; wherein said first RSUG is configured for establishing a sidelink connection with said OBU, wherein, over said sidelink connection, User Plane data are exchanged which are the same User Plane data exchanged over said second C-V2X connection; wherein said telecommunications system further comprises a first Application Server, AppServ, of said source PLMN, said first AppServ being configured for:
   receiving, from a second AppServ of a target PLMN, a request signal, including a request for C-V2X context information, said C-V2X context information comprising a context of said OBU related to the C-V2X service provisioned over said second C-V2X connection;
   sending, to said second AppServ, C-V2X said context information.

15. The telecommunications system according to claim 14, wherein said first AppServ is configured for receiving said request signal after dropping of said first C-V2X connection has occurred.

16. The telecommunications system according to claim 14, wherein said first RSUG is configured for:
   receiving from said OBU, through said sidelink connection, a release indication for release of said second C-V2X connection;
   sending, to said first RBS, a radio link failure indication, triggered by said release indication, to release said second C-V2X connection.

17. The telecommunications system according to claim 14, wherein said first RSUG comprises an Adaptation Unit, AU, module configured to receive User Plane data according to a network-based technology and transcode said User Plane data into User Plane data according to a point-to-point technology.

18. The telecommunications system according to claim 17, wherein said AU module comprises:
   a plurality of transcoding units, each configured to receive User Plane data according to a network-based technology and transcode said User Plane data into User Plane data according to a respective point-to-point technology;
   a selection unit, configured to select, among said transcoding units, a determined transcoding unit to be used for said sidelink connection.

19. The telecommunications system according to claim 18, wherein said selection unit operates according to one or more of the following:
   power and/or quality estimates related to point-to-point technologies supported by the OBU of said vehicle;
   C-V2X service typologies currently provisioned to said vehicle and surrounding vehicles over respective C-V2X connections;
   actual level of usage of each of the point-to-point technologies implemented within the first RSUG;
   surrounding vehicles' C-V2X service requirements;
   availability of specific point-to-point technology onboard of said surrounding vehicles.

* * * * *